United States Patent [19]

Barshad

[11] Patent Number: 4,732,476

[45] Date of Patent: Mar. 22, 1988

[54] CONTINUOUSLY ROTATING GRATING RAPID-SCAN SPECTROPHOTOMETER

[75] Inventor: Yoav Barshad, Ann Arbor, Mich.

[73] Assignee: Barspec Ltd., Rehovot, Israel

[21] Appl. No.: 759,291

[22] Filed: Jul. 26, 1985

[51] Int. Cl.$^4$ .............................................. G01J 3/18
[52] U.S. Cl. ..................................... 356/308; 356/328; 356/334
[58] Field of Search ............... 356/308, 309, 319, 326, 356/328, 332, 334; 364/498

[56] References Cited

U.S. PATENT DOCUMENTS

| | | | |
|---|---|---|---|
| 3,385,160 | 5/1968 | Dawson et al. | 356/308 |
| 3,486,822 | 12/1969 | Harris | 356/308 |
| 3,637,310 | 1/1972 | Naono | 356/309 |
| 3,775,620 | 11/1973 | Meier | 356/334 |
| 3,930,727 | 1/1976 | Vergato | 356/96 |
| 4,000,946 | 1/1977 | Way et al. | 356/89 |
| 4,027,975 | 6/1977 | Turner et al. | 356/100 |
| 4,079,256 | 3/1978 | Ford et al. | 250/343 |
| 4,093,991 | 6/1978 | Christie et al. | 364/525 |
| 4,124,297 | 11/1978 | Hughes et al. | 356/308 |
| 4,158,505 | 6/1979 | Mathisen et al. | 356/308 |
| 4,180,327 | 12/1979 | Maeda et al. | 356/325 |
| 4,203,669 | 5/1980 | Maeda et al. | 356/332 |
| 4,241,997 | 12/1980 | Chraplyvy | 356/309 |
| 4,241,998 | 12/1980 | Farkas et al. | 356/319 |
| 4,273,449 | 6/1981 | Schmid | 356/411 |
| 4,305,663 | 12/1981 | Perkins et al. | 356/323 |
| 4,310,244 | 1/1982 | Perkins et al. | 356/334 |
| 4,315,691 | 2/1982 | Perkins et al. | 356/331 |
| 4,320,971 | 3/1982 | Hashimoto et al. | 356/328 |
| 4,322,807 | 3/1982 | Chamran et al. | 364/498 |
| 4,326,802 | 4/1982 | Smith et al. | 356/316 |
| 4,329,053 | 5/1982 | Fymat | 356/336 |
| 4,330,207 | 5/1982 | Hiroshi et al. | 356/318 |
| 4,330,209 | 5/1982 | Noriyoshi et al. | 356/328 |
| 4,330,210 | 5/1982 | Noriyoshi et al. | 356/328 |
| 4,332,470 | 6/1982 | Chamran et al. | 356/325 |
| 4,346,998 | 8/1982 | Franklin | 356/307 |
| 4,357,668 | 11/1982 | Delany et al. | 364/497 |
| 4,373,813 | 2/1983 | Barber et al. | 356/326 |
| 4,379,637 | 4/1983 | Schmid | 356/411 |
| 4,398,823 | 8/1983 | Brown et al. | 356/334 |
| 4,410,273 | 10/1983 | Chapman et al. | 356/319 |
| 4,412,744 | 11/1983 | Lee et al. | 356/319 |
| 4,424,589 | 1/1984 | Cahill et al. | 382/61 |
| 4,448,530 | 5/1984 | Schmitt et al. | 356/320 |
| 4,462,689 | 7/1984 | Kabler et al. | 356/333 |
| 4,464,051 | 8/1984 | Talmadge et al. | 356/323 |
| 4,468,121 | 8/1984 | Koizumi et al. | 356/328 |
| 4,469,441 | 9/1984 | Bernier et al. | 356/316 |
| 4,540,282 | 9/1985 | Landa et al. | 356/319 |

FOREIGN PATENT DOCUMENTS

| | | |
|---|---|---|
| 2504264 | 10/1982 | France . |
| 52-75601 | 6/1977 | Japan . |
| 55-4254 | 1/1980 | Japan . |
| 57-142524 | 3/1982 | Japan . |

OTHER PUBLICATIONS

Angus, *UV Group Bulletin*, No. 8, Part 1, Jun. 1980, pp. 53–60.

(List continued on next page.)

*Primary Examiner*—F. L. Evans
*Attorney, Agent, or Firm*—James M. Deimen

[57] ABSTRACT

An improved rapid-scan spectrophotometer with an optical grating continuously rotating at a constant angular velocity. An optical trigger actuated by the rotating turntable supporting the grating, actuates an analog to digital converter to sample at discrete times an output signal from the sample detector over the desired wavelength range and to store the digitized information in a direct memory access (DMA) buffer. The information may be retrieved as desired from the buffer for further processing or permanent data storage. With each revolution of the optical grating, the range (typically 15°) of wavelengths from the grating that provides useful information is sampled by the analog to digital converter and stored in the buffer. Because the grating is continuously rotating at a constant angular velocity and is not limited by the inertia of optical components, the spectrophotometer can be operated at a much higher scanning speed than an oscillating or vibrating grating spectrophotometer.

11 Claims, 3 Drawing Figures

OTHER PUBLICATIONS

Angus, *Optical Spectra,* vol. 14, No. 8, Aug. 1980, pp. 49-52.
Direct Log Ratio Recording, Rapid Scanning Spectrophotometer; J. W. Strojek et al; *Analytical Chemistry,* vol. 41, No. 3, Mar. 1969, pp. 481-484.
Recent Instrumentation for UV-Visible Spectrophotometry-Part I (continued): Dual Beam Spectrophotometers; P. F. Lott; Jrnl. of Chemical Education; vol. 45, No. 3; Mar. 1968; pp. A169-A172.
Rapid Scanning Mirror Spectrophotometer; J. Strojek et al; *Polish Journal of Chemistry;* vol. 53, No. 8, Aug. 1979, pp. 1619-1631.

CONTINUOUSLY ROTATING GRATING RAPID-SCAN SPECTROPHOTOMETER

BACKGROUND OF THE INVENTION

The field of the invention pertains to spectrophotometry and, in particular, to rapid-scan spectrophotometers and the speed with which such instruments can scan the relevant spectra.

In well known mechanically scanning spectrophotometers the entrance and exit slits are located on either side of the optical grating. A simple elliptically concave mirror is used as a collimating and focusing mirror intersecting and directing the light from an ultraviolet or visual light generator for a UV/VIS spectrophotometer. The light beams entering the monochromator strike the left side of the mirror, are collimated and reflected to the grating. The diffracted radiation goes to the right half of the same mirror and is focused on the exit slit. The wavelength is selected by simple pivoting of the grating about the monochromator axis. The angle between the incident and diffracted rays remains constant. Either a manual or motor driven sine bar drive produces a direct wavelength readout on a linear scale.

Since the useful range in UV/VIS spectroscopy lies typically within 15 degrees about the grating optical axis, the grating is rotated back and forth over this 15 degree range to scan the region of interest. Mechanical scanning of the desired spectrum is achieved through a device such as a stepping motor. The information from a shaft encoder thereattached is used to translate the angular position of the grating into a wavelength.

Spectrophotometers that rely upon such electromechanically reversing arrangements for the grating cannot truly be considered rapid scanning, because they typically scan about 400 to 2400 nm per minute. The arrangement cannot be increased in speed because of the mechanical cam shaft follower drive and the need to determine the grating position accurately.

Full electronic spectroscopy has been achieved with diode array spectrophotometers that scan the range of 200 to 800 nm 5 to 10 times per second. Such spectrophotometers require custom-made circuits with attendant high cost for limited production. Diode arrays have a limited spectral response and extension into the near and far infra red remains unavailable without arrays of hundreds or thousands of elements.

High-throughput spectroscopy can also be accomplished with a fast mechanical scanner with all reflective optics. Scanning is achieved by vibrating a low-inertia grating or mirror as disclosed in U.S. Pat. No. 4,225,233 and the paper by J. Stoijek and Z. Uziel, Pol. J. Chem., 53, 1619 (1979). The mirror or grating (depending on the optical configuration) is mounted directly on the output shaft of a galvanometer type optical scanner, where the position is a function of the applied electric current. By changing the source, grating, and detector, a wide wavelength range can be covered. A commercial device based on U.S. Pat. No. 4,070,111 is available presently with a vibrating grating. Unfortunately, the scanning speed, although much greater than with the electro-mechanical scanner above, causes increased optical difficulties. To minimize inertia the grating or mirror is very small. A large number of optical elements, fixed magnification between the entrance and exit slits and a high energy input light source are required.

U.S. Pat. No. 4,245,911 discloses a drum cam mechanical drive to oscillate the grating and means to adjust the scanning speed. U.S. Pat. Nos. 4,264,205 and 4,285,596 disclose a conjugate cam mechanical drive to oscillate the grating. In both disclosures the mechanical drive is directed to retaining the accuracy of the mechanical drive and to eliminate play in the mechanical parts thereby reducing noise in the measurements at higher scanning speeds. All such mechanical oscillating drives for the grating are inertia limited because of the reversal of movement in each cycle.

SUMMARY OF THE INVENTION

Applicant has developed a rapid-scan spectrophotometer for UV/VIS spectroscopy at scanning speeds higher than diode arrays without the limitations of spectral range and high cost. Objectives of the new spectrophotometer are to mechanically scan at high speed with a high-inertia concave holographic grating, to minimize the number of optical elements and to integrate the data acquisition and system control into one function.

To accomplish the rapid-scan with a mechanical drive for the grating, the grating is affixed to a relatively high inertia fully rotatable turntable which continuously rotates the grating about its optical axis. The grating is rotated at a predetermined and selected angular velocity and accuracy is improved by adding mass and thereby increasing the inertia of the rotating mass. The optical region of interest is approximately 15 degrees of the rotational sweep as with the oscillating gratings, therefore means are provided to select and coordinate the scanning with the angular position of the grating.

Just before the first wavelength in the desired range appears in the exit slit, an optical trigger actuated by the turntable drive begins the cyclical data acquisition process. The triggering signal actuates an analog to digital (A/D) converter which reads the detector output as a function of time (i.e., wavelength) beginning with the first desired wavelength. The output from the A/D converter is stored in a direct memory access (DMA) buffer. With each rotation of the grating the output is stored in the DMA buffer.

The buffer can be accessed as desired to retrieve any valuable information for further processing and permanent recording.

Because the angular velocity of the grating is constant and the samples taken by the A/D converter accurately spaced in time, the output of the detector as a function of time can be easily converted mathematically into voltages as a function of wavelength. The new spectrophotometer configuration is readily and preferably adapted to interfacing with a personal computer such as the IBM-PC by adding a suitable fast A/D converter card to an expansion slot in the PC. DMA is thereby through the system bus and with suitable programming as further explained below, the output from the detector can be manipulated and processed virtually instantaneously.

Although disclosed herein with respect to UV/VIS spectroscopy, the applicant's spectrophotometer can be adapted to infra red spectroscopy with a suitable source, detector and sample cell.

DESCRIPTION OF THE PREFERRED EMBODIMENT

Figure 1:
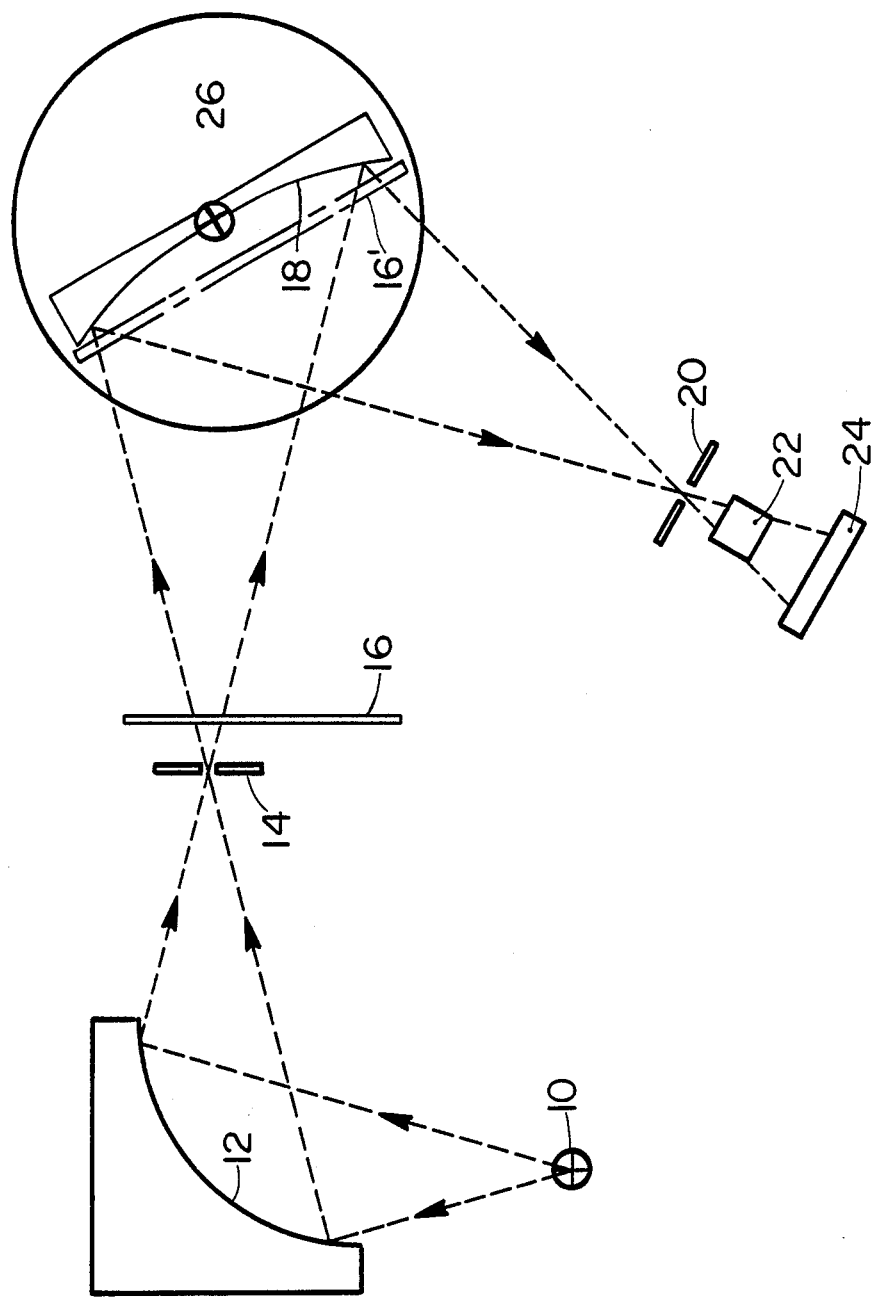
FIG. 1 is a schematic plan view of the new spectrophotometer apparatus.

Illustrated in FIG. 1 is a light source comprising a light generating device 10 and a elliptically curved concave mirror 12. The light generating device 10 provides ultraviolet radiation, visual range radiation or infra-red radiation as required. For the more common uses of a spectrophotometer, a visual range or ultra-violet range light source is selected. Recently available are combined ultra-violet/visual range light sources (UV/VIS). Such a light source provides a complete spectrum over the UV/VIS range most commonly used. The light reflected from the elliptical mirror 12 is directed through a slit 14 and an optional filter wheel 16 to impinge upon a rotating optical grating 18. The optical grating 18 rotates about its optical axis with a constant preselected and predetermined angular velocity. The light reflected from the optical grating 18 is thereupon directed to and through a second slit 20 and through a sample chamber 22 to finally impinge upon a detector 24. The rotating optical grating 18 is mounted on a substantially heavy turntable 26.

As shown, the filter wheel 16 is located just beyond the entrance slit 14. However, the filter wheel may be positioned ahead of the entrance slit 14 or on either side of the exit slit 20. The purpose of the filter wheel is to delete certain wave lengths from the spectrum sample and is a well known option in the spectroscopy field. Typically, the light generating means 10 is either a bulb providing the visual spectrum or a bulb providing the ultra-violet spectrum. However, a new bulb now being introduced by Hamamatsu Instruments of Japan provides the full range of ultraviolet and visual wavelengths from a single point source.

Figure 2:
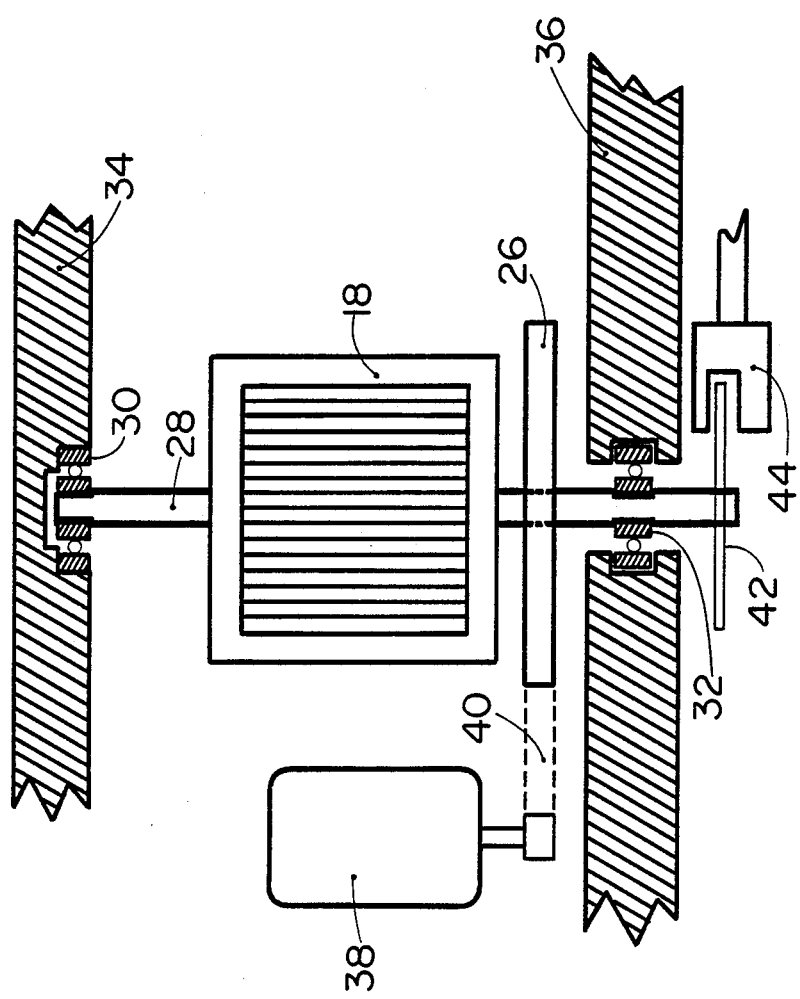
FIG. 2 is a schematic side cross-sectional view of the rotating optical grating and associated electromechanical apparatus.

The supporting wheel or turntable 26 for the optical grating 18 is preferably relatively heavy so as to act as a flywheel. The optical grating 18 itself may be suitably heavy because the increasing weight in the rotating assembly is advantageous in this spectrophotometer. Increased mass helps to retain a constant angular velocity. Referring to FIG. 2 the optical grating 18 and flywheel 26 are mounted on a vertical shaft 28 in turn mounted in bearings 30 and 32. The bearings as shown schematically at 30 and 32 are in turn mounted in a rigid supporting structure 34 and 36. The bearings 30 and 32 are selected for rotational accuracy to eliminate any possibility of translational vibration being transmitted to the optical grating 18. Illustrated next to the flywheel 26 and optical grating 18 is a drive motor 38 preferably of the synchronous type which is schematically connected 40 to the flywheel 26. A suitable drive system might be floppy disk drive or tape drive, selected from the many available for computers. Such a drive in combination with a relatively heavy fly wheel 26 will assure a very constant rotational velocity for the optical grating 18. Also affixed to the shaft 28 is a rotating disk 42 having means 46 (best shown in FIG. 3) located adjacent to the periphery and adapted to actuate the optical trigger 44.

Figure 3:
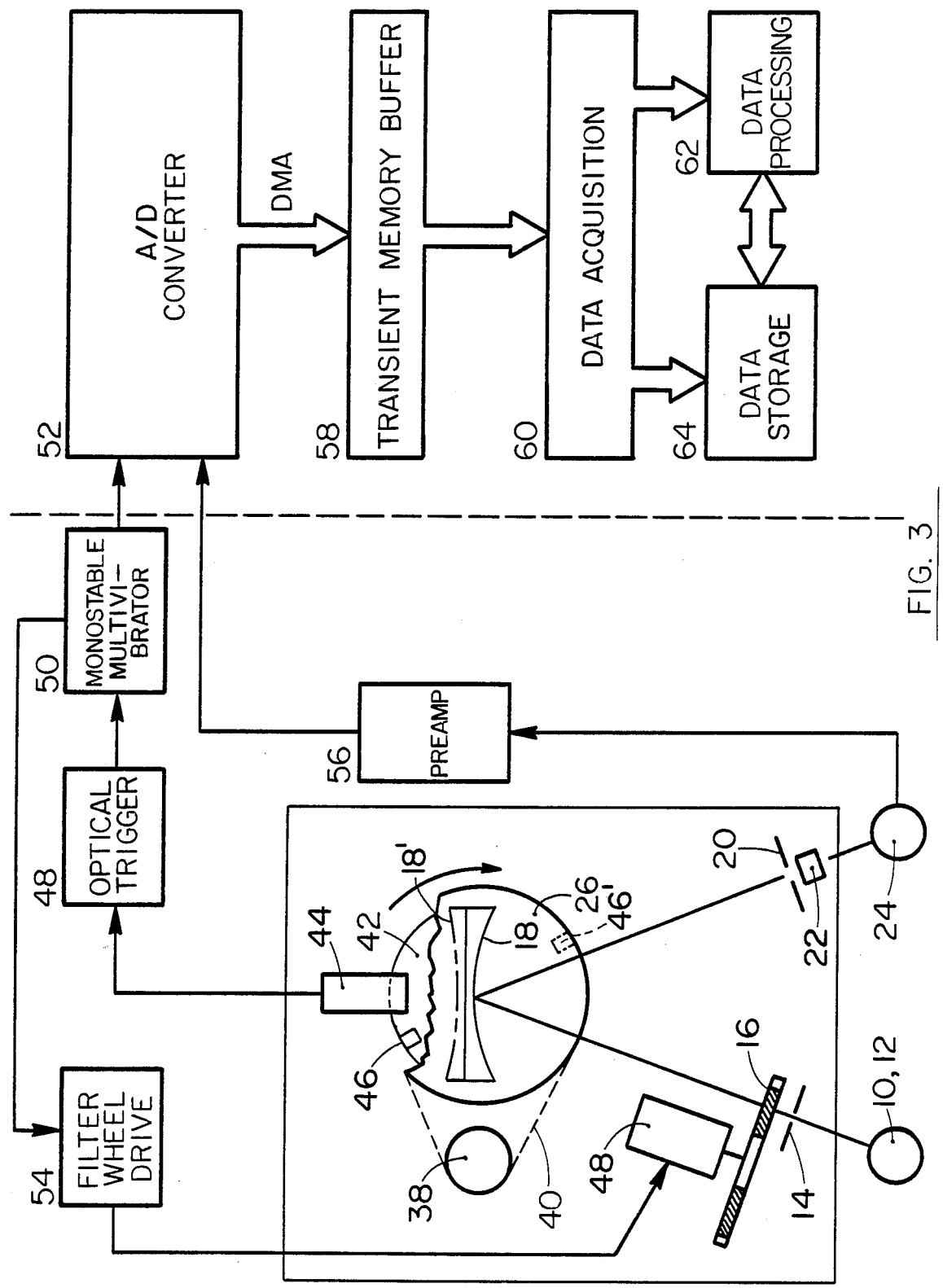
FIG. 3 is a flow diagram of the spectrophotometer apparatus and the associated hardware for processing the electrical output from the spectrophotometer detector.

To the left side of FIG. 3 is a brief schematic of the spectrophotometer apparatus shown in FIG. 1. The light source to the lower left is the combination of the light generating means 10 and elliptical focusing mirror 12. As schematically shown in FIG. 3, the means to actuate the optical trigger 44 is shown as a dark spot 46 that is located beneath the flywheel 26 and on the disk 42.

Referring again to FIG. 3 the actuation signal from the optical trigger 44 is fed through the optical trigger control 48 to a monostable multivibrator 50 which converts the triggering signal to a single square pulse. The square pulse is fed both through the analog to digital A/D converter 52 and to the filter wheel drive control 54. The filter wheel drive control 54 in turn causes the filter wheel 16 motor 48 to rotate the filter wheel in coordination with the rotation of the fly wheel or turntable 26. Simultaneously the signal from the sample detector 24 is fed through a preamplifier 56 to the analog to digital converter 52. Upon the initiation pulse from the monostable multivibrator, the analog to digital converter 52 samples the voltage signal from the detector 24 at a constant rate. The digitized voltage samples are then transferred to a direct memory access buffer 58 for temporary storage.

Thus, just before the first wavelength in the desired range appears in the exit slit 20, the optical trigger 44 starts the cyclical data acquisition process. The triggering signal actuates the analog to digital converter in real time which in turn samples the voltage output from the detector 24. The voltage output from the detector 24 is proportional to the amount of radiation reaching the detector at each wavelength over the range. A very advantageous means of data sampling and further processing can be accomplished by providing the analog to digital converter as an expansion card located in an expansion slot of an IBM-PC or similar personal computer.

The analog to digital card is programmed to take sufficient samples to accurately cover the wavelength range of interest and to repeat the sampling with each rotation of the optical grating 18. The data points representing digitized voltage from the analog to digital card are transferred by direct memory access through the personal computer data bus into a fixed memory location in the buffer with each revolution of the optical grating 18. The data stored in the direct memory access buffer can be selectively retrieved from the buffer 58 by the main data acquisition program in the computer as indicated at 60. Any valuable information contained in the buffer 58 can be moved to a different location for processing as indicated at 62 or relatively permanent data storage memory as indicated at 64, thus clearing the way for a new burst of data to the buffer 58.

Since the angular velocity of the optical grating 18 is constant and the samples taken by the analog to digital card are accurately spaced in time, the digitized voltages taken as a function of time can be easily translated, by using the grating equation or other similar mathematical expression, into voltages as a function of wavelength. Once the acquired data are translated into voltages or amount of radiation as a function of wavelength, they can be used in a variety of application programs as desired. The data can be displayed in either transmittance or absorbance modes by comparing them with a previously taken spectrum of a blank sample (which makes it possible to work with a single beam instrument). With suitable programming, the user interface can be through multiple windows containing graphic displays of the output, available applications, and files containing the data currently being analyzed. Application programs for normal UV/VIS operations, such as smoothing, derivatives, subtractions, additions, and calibration curves, can be provided as can utilities to make the data compatible with popular programs for electronic spreadsheets, plotting, and numerical analysis.

Recently announced as noted above is the availability of a duplex lamp radiation or light source from Hamamatsu Instruments (the Tungsten source for visible light and the Deuterium source for-ultra violet light both have the same focal point). This configuration eliminates the need for imaging of one source through the other, thereby providing a much less complicated light source. The combined flux can then be imaged with an elliptical mirror onto the entrance slit of the monochronomator.

The applications of applicant's new spectrophotometer are manifold. For example, for routine measurements and slow scan, the rapid scan of the instrument permits each spectral element to be represented as a value and corresponding statistical uncertainty. In kinetics, wherein the concentrations of various species are followed as a function of time, to study their dynamic behavior, the new spectrophotometer is capable of acquiring at least ten complete spectra per second (200 nm to 800 nm) with one nm resolution. The new instrument can be used for spectroelectrochemistry, stop flow kinetics and as a detector for liquid chromatography (HPLC) or gas chromatography. Measuring changes in absorbance in samples that are highly heterogeneous is difficult due to scattering. To correct for the scattering effect, light of two different wave lengths is used, one where there is absorbance in the sample and one where there is no absorbance to thereby detect the attenuation caused by scattering. Because a complete spectrum can be collected in a fraction of a second, information coming from two different wave lengths can be considered to be acquired virtually simultaneously, and the dual wave length spectroscopy correction can be applied with a minimum of error.

Other modifications of the spectrophotometer can be added. Because added mass is of benefit to the accuracy of operation of applicant's device, as shown ghosted in FIG. 3 a second grating 18' mounted back to back with the first grating and a second triggering means 46' on the rotating flywheel or shaft permit a double sampling rate at the same angular velocity. Secondly, as shown ghosted in FIG. 1 filters 16' can be mounted on the rotating turntable or flywheel 26 in front of the optical grating 18 to remove second order and other harmonic wavelengths without any weight penalty. Thus, features that cannot be added to the prior art oscillating and vibrating optical gratings without severly impairing the scanning speed, can be added to the continuously rotating optical grating of applicant not only without penalty but with the added advantage that the increase in inertia is of benefit to the accuracy of applicant's spectrophotometer.

I claim:

1. A spectrophotometer comprising a source of multispectral radiation and means to direct the radiation to an optical grating,
    an optical grating located in the path of the radiation from the source,
    said optical grating mounted on a turntable of relatively high mass for rotation about its optical axis,
    means to continuously rotate the optical grating about its optical axis at a constant uninterrupted angular velocity,
    triggering means to select a specified angular range from each revolution of the optical grating,
    a sample detector and an analog to digital converter in communication with the sample detector and the triggering means, and
    a direct memory access buffer to receive output from the analog to digital converter,
    whereby the analog to digital converter samples the output of the detector during the time period for the specified angular range upon actuation by the triggering means and stores the digitized information in the buffer.

2. The spectrophotometer of claim 1 wherein the optical grating and turntable of relatively high mass are in turn affixed to a rotatable shaft and including means rotating with said shaft to actuate the triggering means at at least one angular position of the optical grating.

3. The spectrophotometer of claim 1 including data acquision means to selectably retrieve information stored in the buffer for further processing or permanent storage.

4. The spectrophotometer of claim 1 wherein the source of multispectral radiation comprises a single UV/VIS radiator and an elliptical focusing mirror.

5. The spectrophotometer of claim 1 wherein the means to rotate the optical grating includes a motor and a motor control to set the motor speed.

6. A spectrophotometer comprising a source of multispectral radiation and means to direct the radiation to an optical grating,
    an optical grating located in the path of the radiation from the source, said optical grating mounted on a turntable of relatively high mass for rotation about its optical axis,
    means to continuously rotate the optical grating at a constant uninterrupted angular velocity,
    triggering means to select a specified angular range from each revolution of the optical grating and a sample detector,
    and means in communication with the sample detector and triggering means to sample the output of the sample detector during the specified angular range of the rotating optical grating.

7. The spectrophotometer of claim 6 including a second optical grating mounted for rotation about its optical axis, both said optical gratings being mounted on the turntable of relatively high mass.

8. The spectrophotometer of claim 6 including a second optical grating mounted for rotation about a common optical axis with the first optical axis.

9. The spectrophotometer of claim 6 including filter means mounted in front of the optical grating and rotatable about a common axis with the optical grating.

10. The spectrophotometer of claim 6 wherein a plurality of optical gratings are mounted on a turntable of relatively high mass for rotation therewith.

11. The spectrophotometer of claim 6 wherein the means to sample the output of the sample detector include means for real time storage and retrieval of the sample output.

* * * * *